United States Patent
Slaughter et al.

(10) Patent No.: US 6,627,142 B2
(45) Date of Patent: Sep. 30, 2003

(54) APPARATUS FOR MAKING COMPOSITE STRUCTURES AND METHOD FOR MAKING SAME

(75) Inventors: Steve Slaughter, Palmdale, CA (US); John C. Fish, Santa Clarita, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 29 days.

(21) Appl. No.: 09/919,034

(22) Filed: Aug. 1, 2001

(65) Prior Publication Data

US 2003/0025231 A1 Feb. 6, 2003

(51) Int. Cl.[7] .................. B29C 43/12; B29C 43/34; B29C 70/44
(52) U.S. Cl. .................. 264/510; 264/102; 264/257; 264/258; 264/314; 264/324; 264/511; 264/571; 425/389; 425/405.1
(58) Field of Search .................. 264/102, 510, 264/511, 257, 258, 324, 571, 314; 425/112, 389, 405.1

(56) References Cited

U.S. PATENT DOCUMENTS

| | | | | |
|---|---|---|---|---|
| 4,902,215 A | * | 2/1990 | Seemann, III | 425/406 |
| 4,942,013 A | * | 7/1990 | Palmer et al. | 264/511 |
| 5,304,339 A | * | 4/1994 | Le Comte | 264/511 |
| 5,576,030 A | * | 11/1996 | Hooper | 425/112 |
| 6,048,488 A | * | 4/2000 | Fink et al. | 264/510 |
| 6,159,414 A | | 12/2000 | Tunis, III et al. | |
| 6,297,176 B1 | * | 10/2001 | North et al. | 442/140 |
| 6,406,659 B1 | * | 6/2002 | Lang et al. | 264/510 |
| 6,406,660 B1 | * | 6/2002 | Spurgeon | 264/510 |
| 6,508,974 B1 | * | 1/2003 | Loving | 264/510 |

* cited by examiner

*Primary Examiner*—Stefan Staicovici
(74) *Attorney, Agent, or Firm*—Lockheed Martin Corporation

(57) ABSTRACT

An apparatus for fabricating fiber reinforced plastic structures is provided. The apparatus includes a mold surface upon which can be supported a lay-up of one or more layers of a fibrous material, and over which can be placed a fluid impervious outer sheet with an inlet port and having its edges marginally sealed upon the mold surface to form a chamber. A vacuum outlet is connected to the chamber for drawing a vacuum therefrom. A resin distribution system is positioned between the lay-up and the fluid impervious sheet. The resin distribution system includes a distribution sheet for receiving resin from the inlet port and at least one flat resin distribution line connected to the inlet port.

15 Claims, 2 Drawing Sheets

APPARATUS FOR MAKING COMPOSITE STRUCTURES AND METHOD FOR MAKING SAME

BACKGROUND OF THE INVENTION

1. Field of the Invention

The invention relates to the field of composite structure fabrication apparatus and process of making composite structures using vacuum assisted resin transfer molding techniques and, in particular, to an apparatus and process wherein duel resin distribution system improves resin infusion in the lay-up.

2. Description of Related Art

The vacuum assisted resin transfer molding (VARTM) process to make composite parts is old in the art. In general terms a dry un-impregnated fiber or fabric material is laid up in layers on top of a mold. A vacuum bag is placed about the lay-up and sealed to the mold. A peel ply may be placed on top of the lay-up and between the layers and mold surface to insure that the vacuum bag can be removed from the completed part and that the part can be removed from the mold. Resin is introduced into the vacuum bag, while a vacuum is drawn from beneath the lay-up. This causes the resin to flow through the lay-up. Thereafter, the resin flow is terminated and the resin in the assembly is cured, typically by heating to its curing temperature. To insure even distribution of resin into the lay-up, a resin distribution medium is placed on top of the lay-up, which is designed to cause the resin to evenly distribute there across eliminating resin starved areas.

Many types of resin distribution have been proposed. For example, U.S. Pat. No. 4,132,755 Process for Manufacturing Resin-Impregnated, Reinforced Articles Without The Presence Of Resin Fumes by J. Johnson. Johnson discloses the use of a perforated film between the lay-up and vacuum bag. Resin is fed from the top through the vacuum bag, through the perforated film and into the lay-up. A spring is located at the periphery of the lay-up, but under the perforated film. The spring is coupled to a vacuum line, thus providing a channel such that resin can be more readily transferred into the lay-up. This reference is of interest for disclosing the use of a perforated film and the use of a spring to provide a channel to the perforated film. However, a special perforated film is required and there is still the problem of insuring that the resin reaches all parts of the perforated film. Japanese Patent No. 60-83826 discloses the use of a wire mesh as a distribution median in a vacuum assisted molding process. However, a wire mesh may not necessarily be made to conform to a complex contoured part.

U.S. Pat. No. 2,913,036 Process and Apparatus For Molding Large Plastic Structures by G. H. Smith discloses the use of channels placed on the lay-up that act as resin distribution paths and become reinforcements on the finished part. It is unusable on parts that do not require a reinforcement.

U.S. Pat. No. 4,902,215 Plastic Transfer Molding Techniques For The Production Of Fiber Reinforced Plastic Structures by W. H. Seamann discloses, in general terms, the design of a distribution medium which includes two parts: spaced apart lines and an array of raised pillars. In detail, the distribution medium can be a crisscrossed pattern of mono-filaments with raised segments at the intersection of the mono-filaments; a series of spaced apart strips forming a grid structure; or a knitted cloth with raised segments being areas of increased bulk. A central conduit in the form of a spring is positioned over the peel ply and is in communication with the resin inlet port acts as a central distribution line. Also of interest is U.S. Pat. No 5,052,906 Plastic Transfer Molding Apparatus For The Production Of Fiber Reinforced Plastic Structures by W. H. Seemann, which discloses the use of the distribution medians disclosed in the '215 patent on either side of the lay-up. These distribution mediums are specialized products and may unduly raise fabrication costs.

U.S. Pat. No. 5,403,537 Method For Forming composite Structures by E. C. Seal, et al. discloses a method wherein multiple layers of fibrous reinforcements are assembled into a desired configuration on a support tool, with one of layers of fibrous reinforcement defining a resin carrier fabric (distribution medium) that extends beyond the periphery of the other layers. The layers of fibrous reinforcements and tool are covered with a flexible layer to form an envelope that encapsulates the fibrous reinforcements. A vacuum source evacuating air from the envelope. Resin is introduced into the envelope and fibrous reinforcements by using a flow path through the one layer used as the resin carrier layer. After the fibrous reinforcements have been impregnated, the resin flow is terminated and the resin is cured. What is really happening is that an additional fibrous layer is added to the fiber reinforcements making up the part that extends there beyond and over flow channels at the periphery of the tool. In one embodiment, this extra fibrous layer is separated from the "part" by a release or peel ply. In a second embodiment, the fibrous layer is integral with the part. This distribution medium is designed for use in a process where the resin is introduced from the peripheral edges of the lay-up.

U.S. Pat. No. 6,048,488 One Step Resin Transfer Of Multifunctional Composites Consisting Of Multiple Resins by B. K. Fink, et al. discloses a system wherein a pair of preforms with different permeabilities are installed in a mold separated by a separation layer. Different resins are injected into each preform by the vacuum assisted resin transfer method. The trick to making this process work is the use of a separation layer having permeability lower than the permeability of either of the fiber preforms.

The FASTRAC System developed by the US Army Research Laboratory is also of interest. FASTRAC uses a dual bag with in a bag concept. Both bags are sealed to the mold surface with the lay-up within the inner bag. The outer bag incorporates protrusions. A vacuum is first drawn from between the inner and outer bag. This forces the protrusions into the inner bag creating a pattern of channels. A vacuum is then drawn from between the mold surface and inner bag. Resin is then flowed into the lay-up through the channels. Thus the inner bag acts as a resin distribution medium. This apparatus requires a custom vacuum bag, which may raise fabrication costs.

Thus, it is a primary object of the invention to provide an apparatus for fabricating composite parts by the VARTM process.

It is another primary object of the invention to provide an apparatus for fabricating composite parts by the VARTM process that produces parts at a lower cost.

It is another primary object of the invention to provide an apparatus for fabricating composite parts by the VARTM process using an improved resin distribution medium.

It is a further object of the invention to provide an improved resin distribution medium for the VARTM process.

It is a still further object of the invention to provide an improved resin distribution medium for the VARTM process that uses readily available materials.

SUMMARY OF THE INVENTION

The invention is an apparatus for fabricating fiber reinforced plastic structures and a method of making same. In detail the apparatus includes a fluid impervious outer sheet having a resin inlet port. A mold surface is included upon which can be supported a lay-up of one or more layers of a fibrous material, and over which can be placed the fluid impervious outer sheet and its edges marginally sealed upon the mold surface to form a chamber. A vacuum outlet port in connected to the chamber for drawing a vacuum upon the chamber. A two-part resin distribution medium is positioned between the fabric lay-up and the fluid impervious sheet. The first part of the resin distribution medium is a resin distribution sheet having a first permeability for distributing resin throughout the lay-up. The second part includes at least one resin distribution line in the form of a flat sheet coupled to the inlet port for distributing resin throughout the resin distribution medium. This at least one resin distribution line has a second permeability equal or great than the first permeability of the resin distribution sheet. Preferably, the at least one resin distribution strip is thicker than the resin distribution sheet. A peel ply porous to resin may be positioned between the resin distribution medium and the lay-up and the lay-up and mold surface.

The method of forming the fiber reinforced plastic structures includes the steps of:
1. Placing fibrous material on a mold surface creating a lay-up;
2. Placing a resin distribution medium over the lay-up comprising a resin distribution sheet and at least one flat resin distribution line over the lay-up.
3. Placing a fluid impervious outer sheet having a resin inlet port over the fibrous material and the resin distribution medium and sealing the marginal edges thereof to the mold surface forming a chamber such that resin inlet port is in contact with resin distribution line.
4. Introducing resin into the chamber through the resin inlet port.
5. Drawing a vacuum from the chamber.
6. Curing the resin.

The novel features which are believed to be characteristic of the invention, both as to its organization and method of operation, together with further objects and advantages thereof, will be better understood from the following description in connection with the accompanying drawings, in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
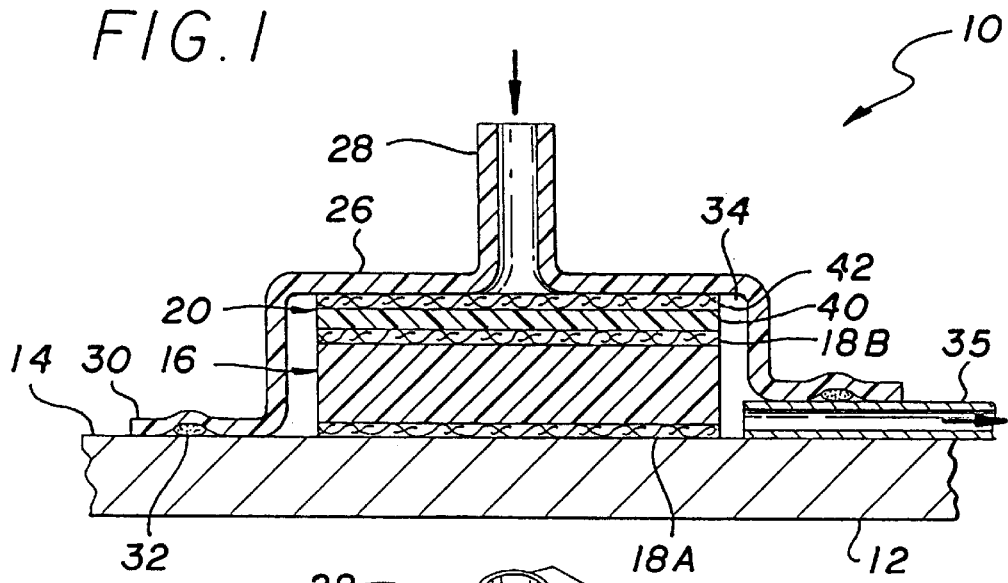
FIG. 1 is a cross-sectional view of the apparatus.
Figure 2:
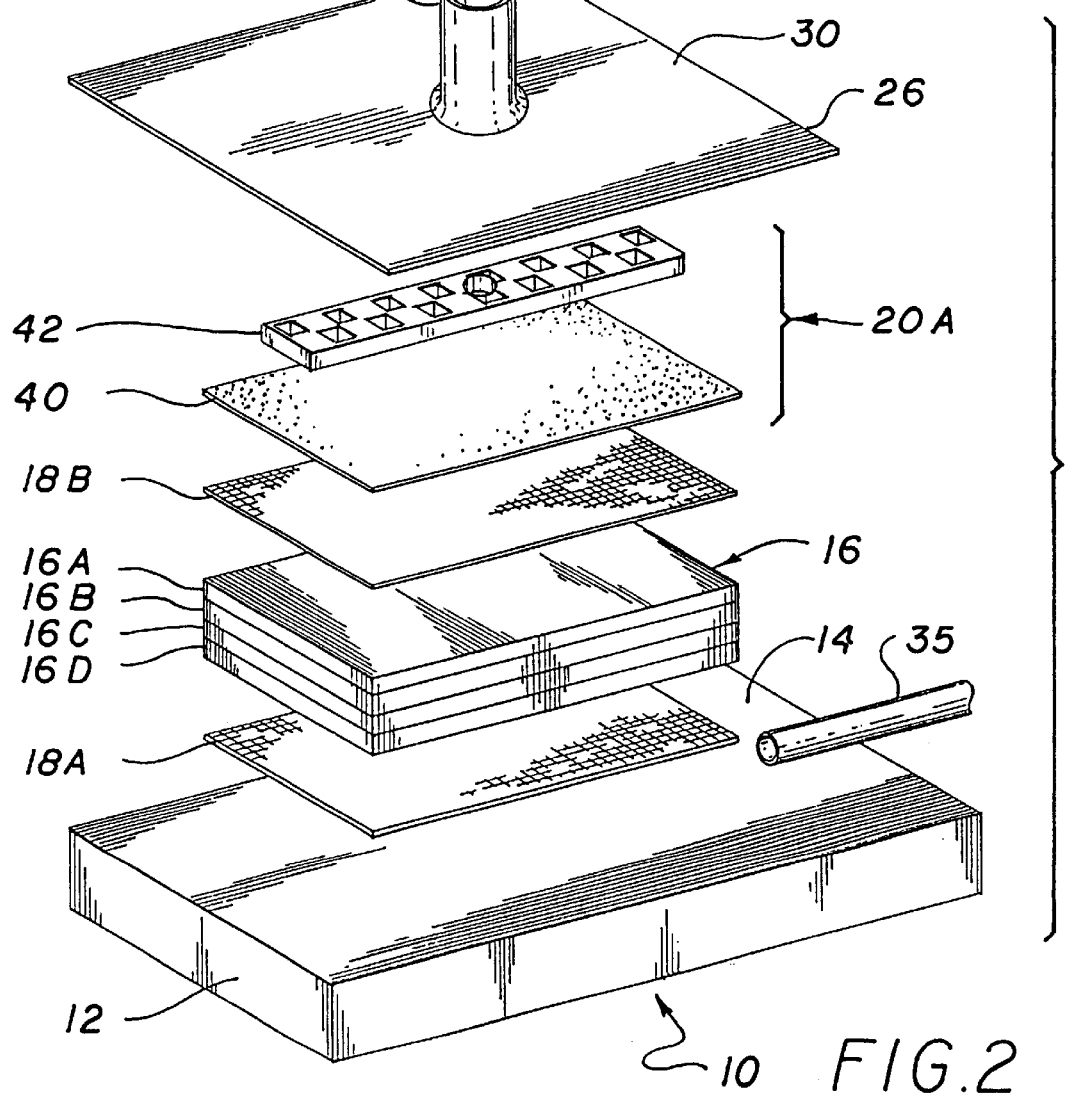
FIG. 2 is an exploded view of the apparatus shown in FIG. 1

Referring to FIGS. 1 and 2, the apparatus, generally indicated by numeral 10, includes a mold 12 having a mold surface 14. For purposes of illustration a flat mold surface 14 is shown, however, the mold surface could have a curved shape. Fibrous material, such woven fiberglass, graphite or other composite reinforcement material is laid-up on the mold surface 14 to form what is commonly called a "lay-up" or "preform" 16 made up of layers 16A, 16B, 16C and 16D. A peel plies 18A and 18B may be positioned on either side of the lay-up 16. The peel plies 18A and 18B are typically made of a material such as a porous TEFLON, for example Release Ease 234TFP, a manufactured by Airtech Products, Incorporated Huntington Beach, Calif., which is porous so that the resin can easily pass through and does not bond to the mold surface 14 or lay-up 16 as the resin cures.

Placed on top of the peel ply 18B is a resin distribution medium assembly 20A, comprising a resin distribution medium 40 and resin distribution strip 42, which will be subsequently discussed in detail. An impervious sheet 26, commonly called a vacuum bag, having a resin inlet port 28 is placed over the assembled lay-up 16, peel plies 18A and 18B, and resin distribution assembly 20A and sealed at its marginal edges 30 to the mold surface 14 by means of a sealant 32 forming a chamber 34. A vacuum port 34 is installed between the mold surface 14 and marginal edge 30 of the impervious sheet 26. A preferred material for the impervious sheet 26 is Nylon manufactured by Airtech Products. The preferred sealant 32 is S-M 5126 manufactured by Schnee-Moorhead, Incorporated, Irving, Tex.

The resin distribution medium 40 can be any of the prior art concepts previously discussed. However, the resin distribution medium, SolarGuardTM manufactured by Roxford Fordell Company, Greenville, S.C. is suitable. Another suitable product is Colbond 7004 manufactured by Colbond, Incorporated, Enka, N.C. Colbond 7004 is a random orientated, heat formed and heat fused mono-filament material. It should be pointed out the use of the mold 14, peel plies 18A and 18B, resin distribution medium 40, and impervious sheet 26 are all old in the art. The novel feature is the use of the resin distribution strip 42.

In the prior art system using only a resin distribution medium 40, resin is flowed into the inlet port 28, while a vacuum is drawn from the outlet port 34. This causes the impervious sheet to collapse down around the distribution medium 40. If there were no distribution medium 40, the resin would have a difficult time completely filling the lay-up 16 and resin starved area or even voids would likely exist in the completed composite structure. However, with a resin distribution medium 40, the resin flows therein and easily spreads over the entire surface of the lay-up 16 greatly reducing the chance of voids and the like.

While all the prior art resin distribution mediums previously discussed will work to some degree, none provide all the necessary attributes of low cost, availability, conformance to complex contours and a high degree of repeatability, while providing complete resin infusion into the lay-up. Therefore, referring to FIG. 3, a preferred distribution medium assembly is disclosed and indicated by numeral 20A, for use with long parts. The distribution medium assembly includes a resin distribution member 40 that has the general shape of the part and made of the previous discussed preferred resin distribution materials with a typical thickness of ⅛ inch. A flat resin line strip 42 made from of a random orientated heat formed and heat fused monofilament Colbondrain CX100 manufactured by Colbond Incorporated. This material preferably has a thickness of around ¼ inch. While it is desirable to have a resin line strip with greater permeability than the distribution sheet member, in some applications, they can be made of the same material.

Figure 3:
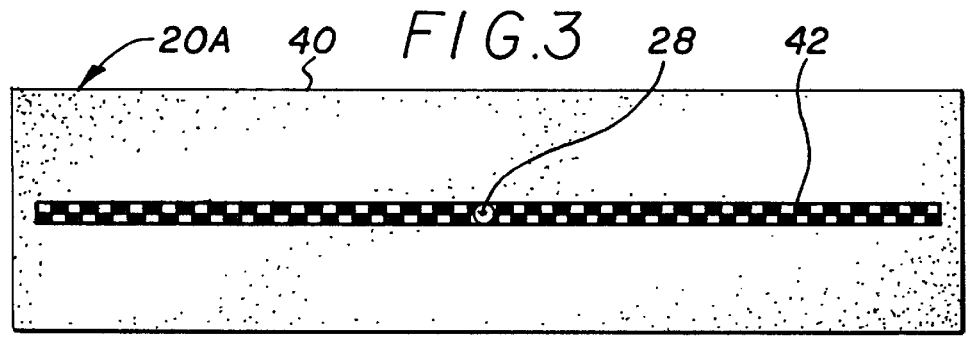
FIG. 3 is a perspective view of a first two-part resin distribution medium.
Figure 4:
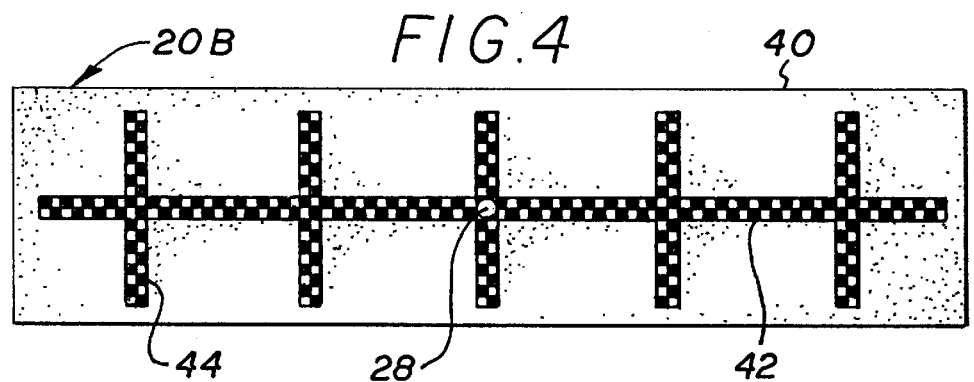
FIG. 4 is a top view of a second two-part resin distribution medium.
Figure 5:
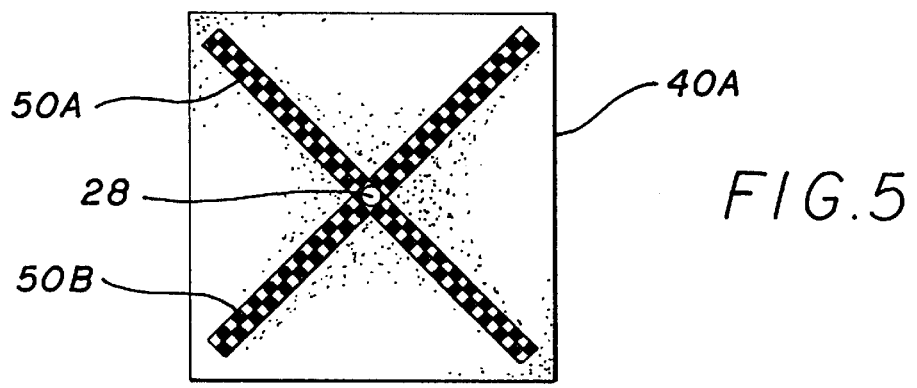
FIG. 5 is a top view of a third two-part resin distribution medium.
Figure 6:
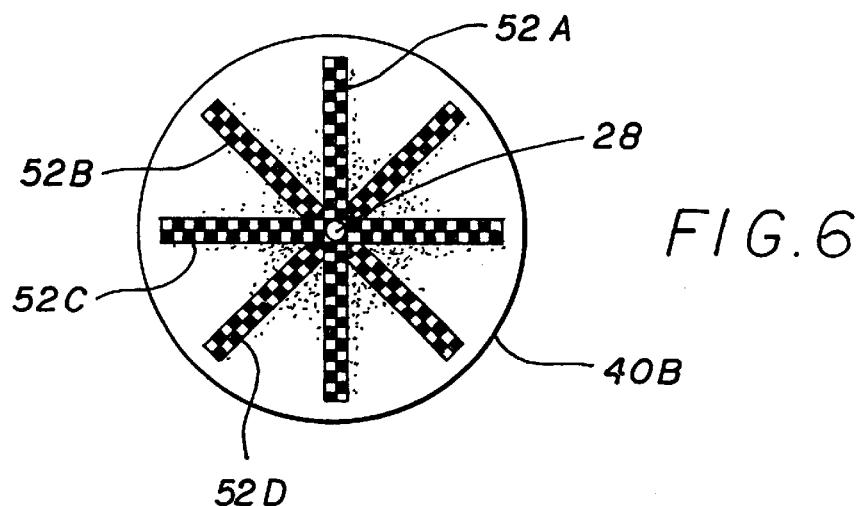
FIG. 6 is a top view of a fourth two-part resin distribution medium.

A second embodiment is shown in FIG. 4, which is identical to that shown in FIG. 3 except that additional resin line strips 44 are laid under the distribution line 42. In very large parts, this may be a necessity to insure that resin is distributed throughout the lay-up. In FIG. 5 is a square lay-up 16B is to be impregnated. Here the resin distribution sheet 40A is also square and to resin line strips 50A and 50B are crisscrossed there over with the resin inlet port 28 at the crossover point. In FIG. 5 a circular lay-up to be impregnated with resin and cured. Here the distribution sheet 40B is circle shaped and a plurality of resin line strips 52A, 52B, 52C and 52D are laid-up in a star like pattern with the resin inlet 28 at the center.

While the parts illustrated are all flat, it should be understood that curved parts or ones with complex contours can be manufactured using the resin distribution assembly. The flat resin distribution lines allow the resin to be distributed into the resin distribution medium in a selected manner so as to insure an even distribution of resin into the lay-up. Being flat, there is little difficulty in maintaining the resin distribution line's position during assembly of the apparatus. In the prior art method of using a spiral spring (previous conduit) it was sometimes difficult to maintain its position. Furthermore, a metal spring is expensive. Additionally, the spiral spring, especially if over lapped, makes it difficult to for the impervious sheet to uniformly follow the counter of the lay-up.

While the invention has been described with reference to a particular embodiments, it should be understood that the embodiments are merely illustrated, as there are numerous variations and modifications, which may be made by those skilled in the art. Thus, the invention is to be construed as being limited only by the spirit and scope of the appended claims.

Industrial Applicability

The invention has applicability to industries manufacturing composite structures.

What is claimed is:

1. An apparatus for fabricating fiber reinforced plastic structures comprising:
    a fluid impervious outer sheet;
    a resin inlet in said fluid impervious outer sheet;
    a mold surface upon which can be supported a lay-up of one or more layers of a fibrous material, and over which said fluid impervious outer sheet is placed and its edges marginally sealed upon said mold surface to form a chamber;
    a vacuum outlet for drawing a vacuum upon said chamber; and
    a resin distribution medium for location between the fabric lay-up and said fluid impervious sheet, said resin distribution medium comprising:
        a resin distribution sheet for distributing resin throughout the lay-up, said resin distribution sheet having a first permeability; and
        at least one resin distribution strip comprising a resin-permeable material in the form of a flat sheet covering a portion of said resin distribution sheet and coupled to said inlet port for distributing resin throughout said resin distribution medium; said at least one resin distribution strip having a second permeability equal or greater than said first permeability of said resin distribution sheet.

2. The apparatus as set forth in claim 1 wherein said at least one resin distribution strip is thicker than said resin distribution sheet.

3. The apparatus as set forth in claim 1, further comprising a first peel ply porous to resin positioned between said resin distribution sheet and the lay-up, and a second peel ply porous to resin positioned between the lay-up and the mold surface.

4. A method for forming fiber reinforced plastic structures comprising the steps of:
    placing fibrous material on a mold surface creating a lay-up;
    placing a resin distribution medium over the lay-up comprising a resin distribution sheet having a first permeability and, at least one flat resin distribution strip comprising a resin-permeable material having a second permeability and covering a portion of said resin distribution sheet, wherein the second permeability is equal or greater than the first permeability;
    placing a fluid impervious outer sheet having a resin inlet port over the fibrous material and the resin distribution medium and sealing the marginal edges thereof to the mold surface forming a chamber such that the resin inlet port is in contact with the resin distribution strip;
    introducing resin into the chamber through the resin inlet port;
    drawing a vacuum from the chamber; and
    curing the resin.

5. The apparatus as set forth in claim 2, further comprising a first peel ply porous to resin positioned between said resin distribution sheet and the lay-up, and a second peel ply porous to resin positioned between the lay-up and the mold surface.

6. The apparatus as set forth in claim 1, wherein the at least one resin distribution strip comprises randomly oriented monofilaments.

7. The apparatus as set forth in claim 1, wherein the resin distribution sheet and resin distribution strip are made of the same material.

8. The apparatus as set forth in claim 1, wherein the resin distribution medium comprises at least two of said resin distribution strips.

9. The apparatus as set forth in claim 8, wherein the resin distribution strips are overlapped.

10. The method as set forth in claim 4, wherein said at least one resin distribution strip is thicker than said resin distribution sheet.

11. The method as set forth in claim 4, further comprising a first peel ply porous to resin positioned between said resin distribution sheet and the lay-up, and a second peel ply porous to resin positioned between the lay-up and the mold surface.

12. The method as set forth in claim 4, wherein the at least one resin distribution strip comprises randomly oriented monofilaments.

13. The method as set forth in claim 4, wherein the resin distribution sheet and resin distribution strip are made of the same material.

14. The method as set forth in claim 4, wherein the resin distribution medium comprises at least two of said resin distribution strips.

15. The method as set forth in claim 14, wherein the resin distribution strips are overlapped.

* * * * *